US008130688B2

(12) United States Patent
Shin et al.

(10) Patent No.: US 8,130,688 B2
(45) Date of Patent: Mar. 6, 2012

(54) MULTIMEDIA BROADCAST MULTICAST SERVICE PROVIDING SYSTEM AND METHOD THEREOF

(75) Inventors: Jae-Wook Shin, Daejeon (KR); Kwang-Ryul Jung, Daejeon (KR); Ae-Soon Park, Daejeon (KR)

(73) Assignees: Electronics and Telecommunications Research Institute, Daejeon (KR); KT Corporation, Seongnam (KR); SK Telecom Co., Ltd., Seoul (KR)

( * ) Notice: Subject to any disclaimer, the term of this patent is extended or adjusted under 35 U.S.C. 154(b) by 910 days.

(21) Appl. No.: 12/086,123

(22) PCT Filed: Dec. 6, 2006

(86) PCT No.: PCT/KR2006/005236
§ 371 (c)(1),
(2), (4) Date: Jun. 5, 2008

(87) PCT Pub. No.: WO2007/066975
PCT Pub. Date: Jun. 14, 2007

(65) Prior Publication Data
US 2009/0080354 A1    Mar. 26, 2009

(30) Foreign Application Priority Data

Dec. 8, 2005  (KR) .................. 10-2005-0120135
Jun. 2, 2006  (KR) .................. 10-2006-0049872

(51) Int. Cl.
*H04H 20/71* (2008.01)
(52) U.S. Cl. ................... 370/312; 370/389; 725/44

(58) Field of Classification Search .............. 370/312, 370/389–392, 432, 335–336, 338, 342–343, 370/345, 400–401, 465–466; 725/39–40, 725/44, 47
See application file for complete search history.

(56) References Cited

U.S. PATENT DOCUMENTS
7,614,068 B2 * 11/2009 Jansky ........................ 725/54
(Continued)

FOREIGN PATENT DOCUMENTS
JP    2005-223718    8/2005
(Continued)

OTHER PUBLICATIONS

International Search Report and Written Opinion of the International Searching Authority mailed Mar. 18, 2009 and issued in corresponding International Patent Application PCT/KR2006/005236.

*Primary Examiner* — Kevin Mew
(74) *Attorney, Agent, or Firm* — Staas & Halsey LLP

(57) ABSTRACT

The present invention relates to a multi-media broadcast and multicast service (MBMS) providing system and a method thereof. The MBMS providing system provides an MBMS to a terminal having an MBMS function. The MBMS providing system includes a service center and a radio access network. The service center provides MBMS data and metadata having service announcement information abut the MBMS to the terminal. The radio access network periodically transmits establishment information for receiving the metadata to the terminal, and provides the metadata and the MBMS data received from the service center to the terminal through nodes for transmitting data. The establishment information includes first establishment information having a service identifier and IP/UDP parameters for receiving the metadata, and second establishment information for establishing a radio channel.

13 Claims, 3 Drawing Sheets

U.S. PATENT DOCUMENTS

| | | | |
|---|---|---|---|
| 7,974,254 B2* | 7/2011 | Vare et al. | 370/342 |
| 2003/0159153 A1* | 8/2003 | Falvo et al. | 725/110 |
| 2005/0207415 A1* | 9/2005 | Curcio et al. | 370/390 |
| 2005/0216472 A1* | 9/2005 | Leon et al. | 707/10 |
| 2006/0015568 A1* | 1/2006 | Walsh et al. | 709/217 |
| 2006/0019618 A1* | 1/2006 | Seppala | 455/121 |
| 2006/0123097 A1* | 6/2006 | Paila et al. | 709/218 |
| 2006/0123099 A1* | 6/2006 | Paila et al. | 709/219 |
| 2006/0177028 A1* | 8/2006 | Vermola | 379/93.28 |
| 2007/0041377 A1* | 2/2007 | Song et al. | 370/389 |
| 2007/0100984 A1* | 5/2007 | Jansky et al. | 709/223 |
| 2007/0107013 A1* | 5/2007 | Seppala et al. | 725/39 |
| 2007/0110057 A1* | 5/2007 | Hwang et al. | 370/389 |

FOREIGN PATENT DOCUMENTS

| | | |
|---|---|---|
| WO | 2004/017540 A1 | 2/2004 |
| WO | 2004/100400 A1 | 11/2004 |
| WO | 2004/102831 A1 | 11/2004 |
| WO | 2005/079101 | 8/2005 |

* cited by examiner

[Fig. 1]
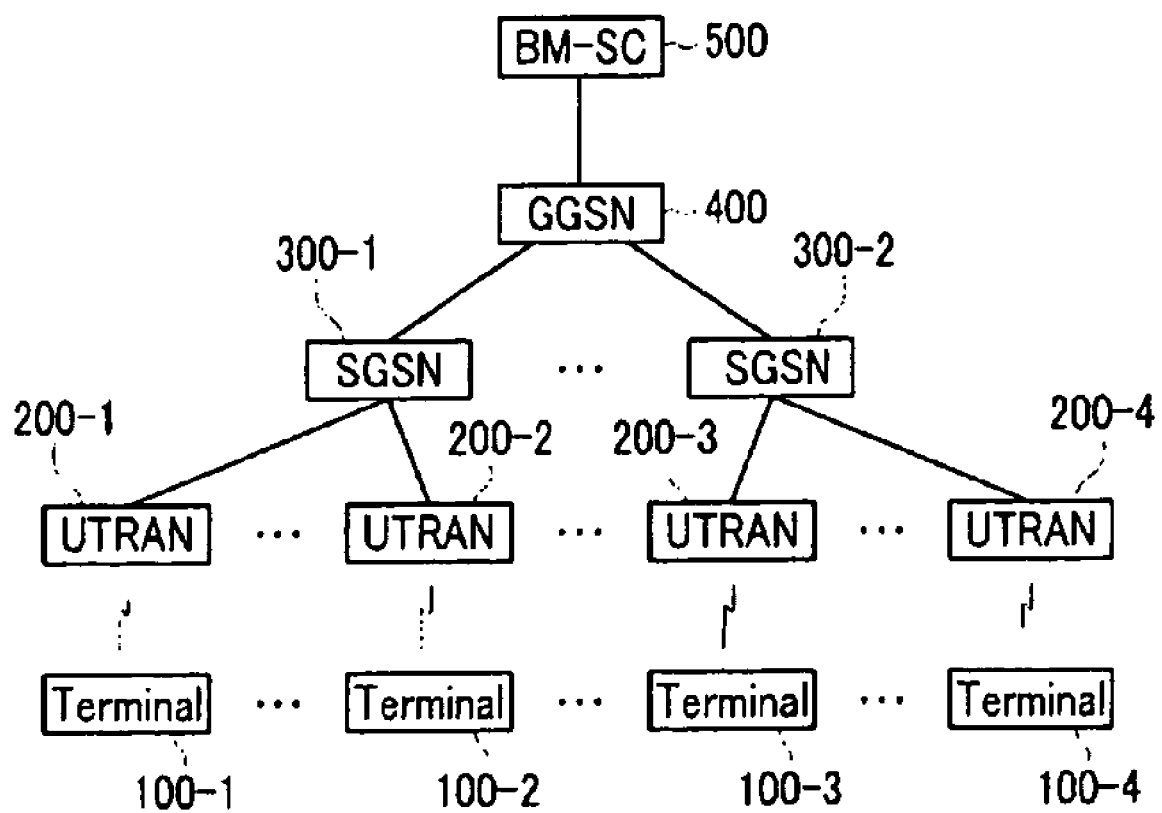

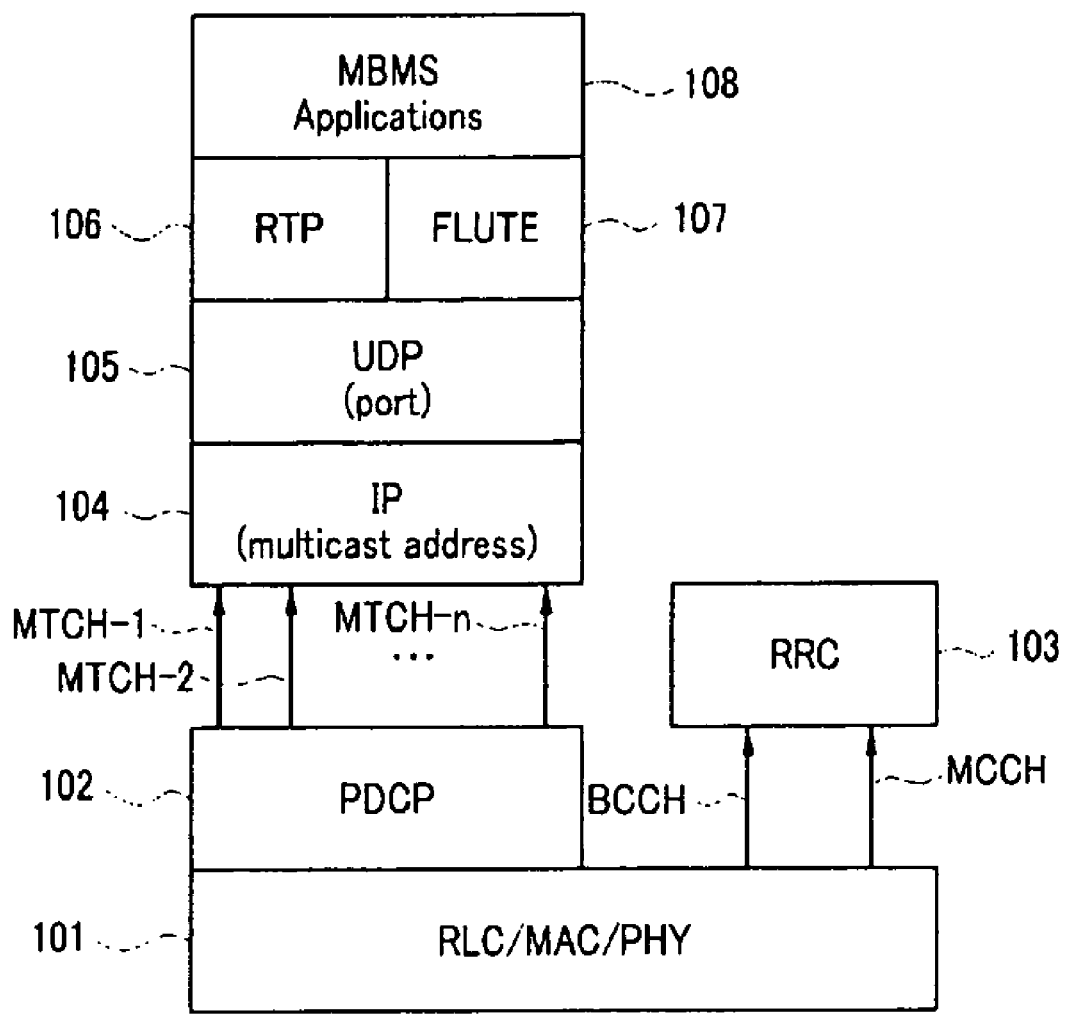
[Fig. 2]

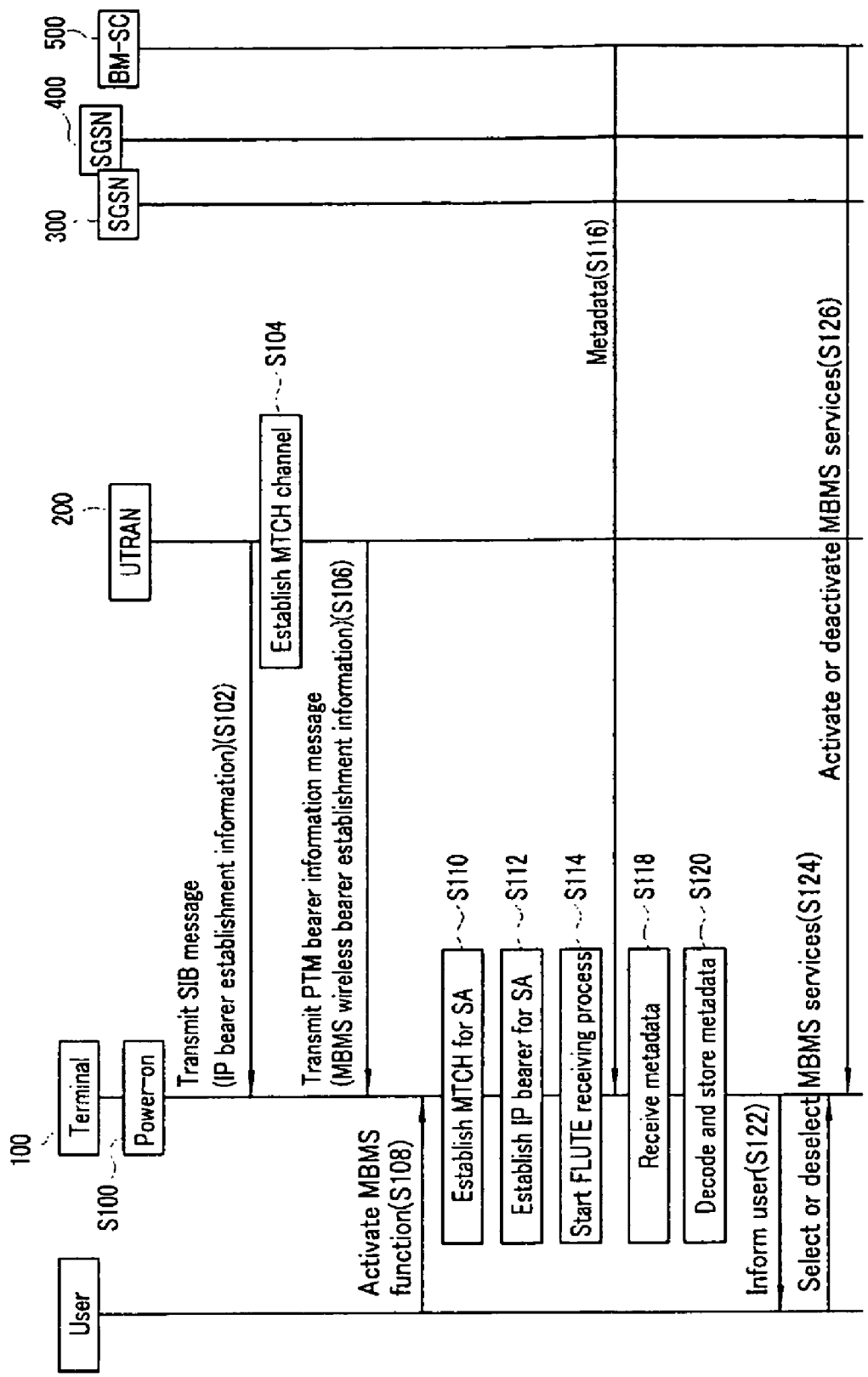
[Fig. 3]

MULTIMEDIA BROADCAST MULTICAST SERVICE PROVIDING SYSTEM AND METHOD THEREOF

CROSS REFERENCE TO RELATED APPLICATIONS

This application claims the benefit under 35 U.S.C. Section 371, of PCT International Application Number PCT/KR2006/005236, filed Dec. 6, 2006 and Korean Applications Nos. 10-2005-0120135 and 10-2006-0049872, filed Dec. 8, 2005 and Jun. 2, 2006, respectively, in Korea, the contents of all of which are incorporated herein by reference.

TECHNICAL FIELD

The present invention relates to a multimedia broadcast multicast service (MBMS) providing system and a method thereof. More particularly, the present invention relates to an MBMS providing system for efficiently performing an MBMS service announcement (SA) in a $3^{rd}$ Generation Partnership Project (3GPP) mobile communication network, and a method thereof.

BACKGROUND ART

A Multimedia Broadcast and Multicast Service (MBMS) is provided to efficiently transmit multimedia data to a plurality of users in a 3rd Generation Partnership Project (3GPP) mobile communication network.

Since a uni-directional multicast bearer is defined in the MBMS rather than a conventional bi-directional unicast bearer, and multicast data are transmitted to a plurality of user terminals through the uni-directional multicast bearer in a network, resources may be efficiently used.

To provide the MBMS, it is required to perform a service announcement (SA). When the service announcement is performed, a network gives information on the MBMS service to terminals in the network. The information (i.e., metadata) transmitted from the network to the terminal by the service announcement includes a name of each MBMS service, a service identifier, a service type, and Internet protocol (IP)/user datagram protocol (UDP) parameters (i.e., a multicast IP address, and a UDP port) for receiving a service.

The service announcement is realized by various methods. In addition, the service announcement is efficiently transmitted when it is transmitted by using the MBMS, since it has a multicast service characteristic. That is, the metadata for the service announcement are defined as the "service announcement (SA)" in the MBMS service, and are multicast from a network to a terminal through a corresponding MBMS bearer.

However, to receive the metadata for the service announcement, the terminal needs to have a service identifier, a multicast IP address, and a UDP port to establish the corresponding MBMS bearer.

While the information for the conventional MBMS service that includes the service identifier, the multicast IP address, and the UDP port is transmitted to the terminal by the metadata, the information for the "service announcement" service may not be transmitted to the terminal by the metadata since it is required to be transmitted to the terminal before receiving the metadata.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multimedia broadcast and multicast service (MBMS) providing system for efficiently performing an MBMS service announcement (SA) in a 3rd Generation Partnership Project (3GPP) mobile communication network, and a method thereof.

Technical Solution

An exemplary multimedia broadcast and multicast service (MBMS) providing system for providing an MBMS to a terminal having an MBMS function according to an embodiment of the present invention includes a service center and a radio access network. The service center provides MBMS data and metadata having service announcement information about the MBMS to the terminal. The radio access network periodically transmits establishment information for receiving the metadata to the terminal, and provides the metadata and the MBMS data received from the service center to the terminal through nodes for transmitting data.

Here, the establishment information includes first establishment information having a service identifier and Internet protocol (IP)/user datagram protocol (UDP) parameters for receiving the metadata, and second establishment information for establishing a radio channel.

An exemplary terminal according to a second embodiment of the present invention provides data to a user, and the data are received from a radio access network of a system for providing a multimedia broadcast and multicast service (MBMS). The exemplary terminal includes a radio link control (RLC)/medium access control (MAC)/physical (PHY) layer, a radio resource control (RRC) layer, and an MBMS application layer. The radio link control (RLC)/medium access control (MAC)/physical (PHY) layer receives establishment information for receiving service announcement information for the MBMS from the radio access network by using a radio link. The radio resource control (RRC) layer receives the establishment information, and establishes a radio channel such that the service announcement information is received based on the establishment information. The MBMS application layer receives the service announcement information according to the radio channel establishment, and provides the service announcement information to the user.

In this case, the establishment information includes first establishment information having a service identifier and IP/UDP parameters for receiving the metadata, and second establishment information for establishing a radio channel.

In an exemplary method for providing a multimedia broadcast and multicast service (MBMS) to a terminal having an MBMS function according to a third exemplary embodiment of the present invention, a) first establishment information having service identifier and IP/UDP information for receiving metadata having a service announcement for the MBMS is transmitted to the terminal by using a first channel, b) second establishment information having radio channel information for receiving the metadata is transmitted to the terminal by using a second channel, c) MBMS information is provided to the terminal, and d) MBMS activation or deactivation information is received from the terminal and a service according to the information is provided.

Here, the first channel is a broadcast control channel (BCCH), and the second channel is a multicast control channel (MCCH).

In an exemplary multimedia broadcast and multicast service (MBMS) method for providing data to a user by a terminal according to a fourth embodiment of the present invention, the data being received from a radio access network of an MBMS providing system, a) first establishment information having service identifier and IP/UDP information for receiving metadata having service announcement for the MBMS is received from the radio access network, b) second establishment information having radio channel information for receiving the metadata is received from the radio access network, c) IP/UDP and a radio channel are established based on the first establishment information and the second establishment information, and d) service announcement information for the MBMS is received from the radio access network based on the establishment of c).

After d), e) the received service announcement information is decoded and stored, f) the stored service announcement information is provided to the user, and g) activation or deactivation information according to an MBMS request from the user based on c) is transmitted to the radio access network.

ADVANTAGEOUS EFFECTS

According to the exemplary embodiment of the present invention, since the MBMS providing system uses the UTRAN to provide information for the SA to the terminal, the service announcement process may be efficiently provided through the MBMS bearer.

BRIEF DESCRIPTION OF THE DRAWINGS

FIG. 1 shows a block diagram of a multimedia broadcast multicast service (MBMS) providing system according to an exemplary embodiment of the present invention.

FIG. 2 shows a block diagram of a protocol stack configuration of a terminal used in the MBMS providing system according to the exemplary embodiment of the present invention.

FIG. 3 shows a data flowchart representing an MBMS providing method of the MBMS providing system according to the exemplary embodiment of the present invention.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" or variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

A multimedia broadcast multicast service (MBMS) providing system according to an exemplary embodiment of the present invention and a method thereof will now be described with reference to the figures.

FIG. 1 shows a block diagram of the MBMS providing system according to the exemplary embodiment of the present invention.

As shown in FIG. 1, The MBMS providing system according to the exemplary embodiment of the present invention includes a broadcast and multicast service center (BM-SC) 500, a gateway general packet radio service support node (GGSN) 400, a serving general packet radio service support node (SGSN) 300, and a universal mobile telecommunications system terrestrial radio access network (UTRAN) 200, and the respective nodes 300 and 400, the UTRAN 200, and the BM-SC 500 are accessed to each other in a wired link.

A terminal 100 is accessed to the UTRAN 200 through a radio link to receive MBMS data from the BM-SC 500.

The MBMS providing system of a 3rd Generation Partnership Project (3GPP) mobile communication network configuration has a tree-type network configuration, in which a plurality of SGSNs 300 are accessed to one GGSN 400, and a plurality of UTRANs 200 are accessed to one SGSN 300.

For the MBMS, a uni-directional MBMS radio bearer is defined between the terminal 100 and the UTRAN 200, and a uni-directional wired MBMS bearer is defined among the UTRAN 200, the SGSN 300, and the GGSN 400.

The MBMS data are generated by the BM-SC 500 and are transmitted to the GGSN 400. The MBMS data transmitted to the GGSN 400 are transmitted to the terminal 100 through the SGSN 300 and the UTRAN 200 by the uni-directional wired and MBMS radio bearer.

The respective MBMS data transmitted from the BM-SC 500 to the terminal 100 is identified by the terminal by using its own multicast Internet protocol (IP) address, and a uni-directional IP bearer is defined between the terminal 100 and the BM-SC 500.

A configuration of the MBMS providing system will now be described with reference to FIG. 1.

The BM-SC 500 provides a service announcement (SA) function for transmitting the metadata (i.e., the information about services provided by the BM-SC 500) to the terminals 100 having the MBMS function, and provides a service for the MBMS requested by the respective terminals 100. That is, the BM-SC 500 transmits the metadata to the terminal 100 through the GGSN 400, the SGSN 300, and the UTRAN 200, receives a service request according to the metadata, and provides a corresponding service. In this case, the metadata includes service announcement information which is service information on the MBMS.

The GGSN 400 manages the plurality of SGSNs 300, and is a gateway node for performing session management of packets received from the plurality of SGSNs 300 and performing mobility management of the terminal 100 in the 3GPP network, and the SGSN 300 is a node for performing received packet call process, session management, and terminal mobility management functions.

The UTRAN 200 periodically broadcasts a radio resource control (RRC) system information block (SIB) message to the plurality of terminals 100 through a broadcast control channel (BCCH). In this case, the SIB message includes MBMS IP bearer establishment information and a service identifier for receiving the metadata, and the MBMS IP bearer establishment information includes a multicast IP address and UDP port information.

In addition, the UTRAN 200 periodically broadcasts an RRC MBMS point-to-multipoint (PTM) bearer message including MBMS radio bearer establishment information corresponding to the metadata through a multicast control channel (MCCH). In this case, the MBMS radio bearer establishment information includes multicast traffic channel (MTCH) establishment information for receiving the metadata received from the BM-SC 500.

Here, it is assumed that the service identifier multicast IP address, the UDP port information, and the MBMS radio bearer establishment information included in the message broadcasted by the UTRAN 200 is previously established by a network operator, and it may be changed.

The terminal 100 establishes the MBMS bearer by the service identifier, the multicast IP address, the UDP port information, and the MTCH establishment information received by the RRC SIB message and an RRC MBMS PTM bearer information message, starts a file delivery over a unidirectional transport entity (FLUTE) receiving process according to the MBMS bearer establishment, receives the metadata transmitted from the BM-SC 500 through the UTRAN 200, and provides the metadata to a user.

In addition, the terminal 100 knows a currently provided service by the metadata of the SA, and activates the service according to a user request.

Further, since the terminal 100 establishes the MBMS bearer for receiving the MBMS data, it may receive the MBMS data including information on a desired MBMS. When it is not required to receive the currently received MBMS data according to the user request, the terminal 100 deactivates the service, and releases the MBMS bearer for receiving the MBMS data.

According to the MBMS providing system, since the UTRAN transmits the RRC SIB message and the RRC MBMS PTM bearer information message to the terminal, there is a merit in that the metadata for the SA transmitted from the BM-SC are received after the terminal establishes the MBMS bearer and FLUTE receiving process based on the received RRC SIB message and RRC MBMS PTM bearer information message. That is, a service announcement process may be efficiently performed through the MBMS bearer in the 3GPP mobile communication network.

A protocol configuration of the terminal used in the MBMS providing system will now be described.

FIG. 2 shows a block diagram of a protocol stack configuration of the terminal used in the MBMS providing system according to the exemplary embodiment of the present invention.

As shown in FIG. 2, a protocol stack of the terminal 100 shown in FIG. 1 according to the exemplary embodiment of the present invention includes an MBMS application layer 108, RTP and FLUTE layers 106 and 107, a UDP layer 105, an IP layer 104, an RRC layer 103, a PDCP layer 102, and an RLC/MAC/PHY layer 101.

The terminal 100 receives the MBMS data transmitted from the BM-SC 500 shown in FIG. 1 from the UTRAN 200 shown in FIG. 1 through the MBMS radio bearer (i.e., the MTCH channel) defined by the RLC/MAC/PHY layer 101 and the PDCP layer 102.

The MTCH is respectively established for the respective MBMS data activated by the terminal 100, by the RRC layer 103. One MTCH corresponds to one MBMS IP bearer, and one MBMS IP bearer includes one service identifier, one multicast IP address, and at least one UDP port. That is, the terminal 100 establishes the MBMS radio bearer by the RRC layer to receive the metadata and MBMS data transmitted from the UTRAN, and the MBMS application layer establishes the corresponding MBMS IP bearer.

The MBMS data received in the terminal are classified as streaming that are transmitted by using the RTP layer 106 and file delivery that are transmitted through the FLUTE layer 107, and the MBMS application layer 108 may be defined by the plurality of RTP 106 and FLUTE 107 sessions. In this case, the MBMS application layer 108 receives the metadata and the MBMS data based on the MBMS radio bearer establishment and the MBMS IP bearer establishment and provides them to the user.

MBMS data control in a radio link between the terminal 100 and the UTRAN 200 is performed by an RRC protocol message transmitted through the MCCH. That is, the terminal 100 uses the RRC layer 103 to receive the service identifier for each MBMS service provided in a current cell and the MBMS radio bearer establishment information from the UTRAN 200 through the MCCH channel.

In addition, the terminal 100 uses the RRC layer 103 to receive the MBMS IP bearer establishment information from the UTRAN 200.

MCCH establishment information is transmitted through the BCCH for performing a system broadcasting information transmitting function, and, when the power of the terminal 100 is turned on, the terminal receives the MCCH establishment information through the BCCH and establishes the MCCH by using the MCCH establishment information.

FIG. 3 shows a data flowchart representing an MBMS providing method of the MBMS providing system according to the exemplary embodiment of the present invention.

As shown in FIG. 3, an MBMS providing process according to the exemplary embodiment of the present invention starts when the terminal 100 shown in FIG. 1 operates in step S100.

When the terminal 100 operates, the RRC SIB message and the PTM bearer information message are received from the UTRAN 200 shown in FIG. 1.

That is, the UTRAN 200 periodically broadcasts the RRC SIB message through the BCCH in step S102. Here, the SIB message includes the service identifier for receiving the metadata for the SA, and the MBMS IP bearer establishment information including the multicast IP address and the UDP port information.

In addition, the UTRAN 200 establishes the MTCH for receiving the metadata of the terminal 100 in step S104, and it uses the MCCH to periodically transmit the RRC MBMS PTM bearer information message to the terminal 100 in the cell in step S106. In this case, the RRC MBMS PTM bearer information message includes the MTCH establishment information which is the MBMS radio bearer establishment information corresponding to the metadata.

The terminal 100 receives a request for MBMS function activation from the user in step S108, and the MTCH for the SA for receiving the metadata is established in step S110 according to radio bearer establishment information received by the MBMS PTM message of the MCCH to activate the MBMS function according to the request.

In addition, the terminal 100 establishes the MBMS IP bearer in step S112 according to multicast IP address for the SA and the UDP port information for the SA received by the SIB message of the BCCH, and it starts the FLUTE receiving process according to the MBMS bearer in step S114.

When the MBMS bearer establishment is finished, the terminal 100 receives the metadata through the MBMS bearer in steps S116 and S118. Here, the metadata includes information relating to the MBMS services provided by the BM-SC 500 (e.g., a service name, the service identifier, a service type, a service parameter, and an MBMS IP bearer establishment parameter).

The terminal 100 decodes and stores the metadata received by the FLUTE receiving process in step S120. Subsequently, the terminal informs the user of the currently provided MBMS service in step S122.

The terminal 100 receives a request for selecting or deselecting the currently provided MBMS service from the user in step S124, and it activates or deactivates the MBMS service to the BM-SC 500 according to the received service selecting or deselecting request in step S126.

The BM-SC 500 provides the MBMS to the terminal 100 according to an activation or deactivation operation performed by the terminal 100.

In the above MBMS providing method, the service announcement (SA) may be efficiently provided to the user.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A multimedia broadcast and multicast service (MBMS) providing system for providing an MBMS to a terminal having an MBMS function, the MBMS providing system comprising:
   a service center for providing MBMS data and metadata having service announcement information about the MBMS to the terminal; and
   a radio access network for periodically transmitting establishment information for receiving the metadata to the terminal, and providing the metadata and the MBMS data received from the service center to the terminal through nodes for transmitting data,
   wherein the establishment information comprises first establishment information having a service identifier and Internet protocol (IP)/user datagram protocol (UDP) parameters for receiving the metadata, and second establishment information for establishing a radio channel.

2. The MBMS providing system of claim 1, wherein the radio access network transmits the first establishment information through a broadcast control channel (BCCH), and transmits the second establishment information through a multicast control channel (MCCH).

3. The MBMS providing system of claim 1, wherein: the first establishment information comprises the service identifier for receiving the metadata, a multicast IP address, and a UDP port number, and the second establishment information comprises multicast traffic channel (MTCH) establishment information.

4. A terminal device for providing data to a user, the data received from a radio access network of a system for providing a multimedia broadcast and multicast service (MBMS), the device terminal comprising:
   a radio link control (RLC)/medium access control (MAC)/physical (PHY) layer of the processor for receiving establishment information for receiving service announcement information for the MBMS from the radio access network by using a radio link;
   a radio resource control (RRC) layer of the processor for receiving the establishment information, and establishing a radio channel such that the service announcement information is received based on the establishment information;
   an MBMS application layer of the processor for receiving the service announcement information according to the radio channel establishment, and providing the service announcement information to the user; and
   the establishment information comprises first establishment information having a service identifier and Internet protocol (IP)/user datagram protocol (UDP) parameters for receiving metadata having service announcement information about the MBMS to the terminal, and second establishment information for establishing a radio channel.

5. The terminal device of claim 4, wherein the RRC receives the first establishment information from the radio access network through a broadcast control channel (BCCH), and receives the second establishment information through a multicast control channel (MCCH).

6. A method for providing a multimedia broadcast and multicast service (MBMS) to a terminal having an MBMS function, the method comprising:
   a) transmitting first establishment information having service identifier and Internet protocol (IP)/user data gram protocol (UDP) information for receiving metadata having a service announcement for the MBMS, to the terminal by using a first channel;
   b) transmitting second establishment information having radio channel information for receiving the metadata, to the terminal by using a second channel;
   c) providing MBMS information to the terminal; and
   d) receiving MBMS activation or deactivation information from the terminal, and providing a service according to the activation or deactivation information.

7. The method of claim 6, wherein the first channel is a broadcast control channel (BCCH), and the second channel is a multicast control channel (MCCH).

8. The method of claim 7, wherein the first establishment information and the second establishment information are periodically provided to the terminal.

9. The method of claim 8, wherein the first establishment information is transmitted by a system information block (SIB) message, and the second establishment information is transmitted by a point-to-multipoint (PTM) bearer information message.

10. A multimedia broadcast and multicast service (MBMS) method for providing data to a user by a terminal, the data being received from a radio access network of an MBMS providing system, the method comprising:
    a) receiving first establishment information from the radio access network, the first establishment information having a service identifier and Internet protocol (IP)/user data gram protocol (UDP) information for receiving metadata having a service announcement for the MBMS;
    b) receiving second establishment information from the radio access network, the second establishment information having radio channel information for receiving the metadata;
    c) establishing IP/UDP and a radio channel based on the first establishment information and the second establishment information; and
    d) receiving service announcement information for the MBMS from the radio access network based on the establishment of c).

11. The method of claim 10, wherein, after d): e) decoding and storing the received service announcement information;

f) providing the stored service announcement information to the user; and g) transmitting activation or deactivation information according to an MBMS request from the user based on c), to the radio access network.

12. The method of claim 10, wherein c) comprises: establishing the IP/UDP based on the first establishment information; establishing the radio channel based on the second establishment information; and starting a file delivery over unidirectional transport entity (FLUTE) receiving process based on the IP/UDP and radio channel establishment.

13. The method of claim 10, wherein the first establishment information is received by a broadcast control channel (BCCH), and the second establishment information is received by a multicast control channel (MCCH).

* * * * *